US 7,694,573 B2

(12) United States Patent
Giordano

(10) Patent No.: US 7,694,573 B2
(45) Date of Patent: Apr. 13, 2010

(54) MECHANICALLY CALIBRATED ANALOG TRANSDUCER FOR POSITION OR A RELATED PHYSICAL QUANTITY

(75) Inventor: Sergio Giordano, Caselle Torinese (IT)

(73) Assignee: ITW METALFLEX, druzba za proizvodnjo delov za gospodinsjke aparate, d.o.o Tolmin, Tolmin (SI)

( * ) Notice: Subject to any disclaimer, the term of this patent is extended or adjusted under 35 U.S.C. 154(b) by 0 days.

(21) Appl. No.: 12/067,437

(22) PCT Filed: Sep. 19, 2006

(86) PCT No.: PCT/IB2006/002596

§ 371 (c)(1),
(2), (4) Date: Jun. 3, 2008

(87) PCT Pub. No.: WO2007/034294

PCT Pub. Date: Mar. 29, 2007

(65) Prior Publication Data
US 2008/0257055 A1 Oct. 23, 2008

(30) Foreign Application Priority Data
Sep. 20, 2005 (IT) .......................... TO2005A0643

(51) Int. Cl.
G01L 9/10 (2006.01)
(52) U.S. Cl. ...................................... 73/722
(58) Field of Classification Search ............ 73/700–756
See application file for complete search history.

(56) References Cited

U.S. PATENT DOCUMENTS

| 3,967,504 | A | 7/1976 | Akeley |
| 4,006,402 | A | 2/1977 | Mincuzzi |
| 4,165,653 | A | 8/1979 | Morehouse |
| 5,760,577 | A | 6/1998 | Shizuya |
| 5,955,191 | A | 9/1999 | Hirokane et al. |
| 2005/0000291 | A1 | 1/2005 | Shirai et al. |

(Continued)

FOREIGN PATENT DOCUMENTS

CN 1465960 1/2004

(Continued)

OTHER PUBLICATIONS

ISR for PCT/IB2006/002596 dated Jan. 19, 2007.

*Primary Examiner*—Andre J Allen
(74) *Attorney, Agent, or Firm*—Lowe Hauptman Ham & Berner LLP

(57) ABSTRACT

An analogue position transducer, usable for example as a pressure switch in a household appliance, includes a rigid casing accommodating a deformable membrane sensitive to hydraulic pressure, a first element engaged to the membrane so as to be mobile along with at least one portion of membrane in a predetermined direction (A), and a second element fixed to the casing and operatively coupled with the first element to provide a signal variable according to the relative position of the first element with respect to the second element. Between the first element and a portion of the membrane, an element is interposed for varying, along the predetermined direction, the relative position of the first element with respect to the portion of the membrane. The transducer also includes a spring fitted and preloaded between the casing and the membrane, and a further element for adjusting the preload of the spring.

20 Claims, 2 Drawing Sheets

U.S. PATENT DOCUMENTS

2008/0155847 A1   7/2008   McAllister

FOREIGN PATENT DOCUMENTS

| | | |
|---|---|---|
| DE | 4444167 A1 | 7/1995 |
| FR | 2767194 | 2/1999 |
| GB | 2225030 | 5/1990 |
| GB | 2423372 | 8/2006 |
| JP | 63191937 | 8/1988 |
| JP | 10049926 | 2/1998 |
| JP | 2000019046 | 1/2000 |
| JP | 2001170393 | 6/2001 |
| KR | 20030009848 | 2/2003 |
| WO | 03/078951 A1 | 9/2003 |

US 7,694,573 B2

MECHANICALLY CALIBRATED ANALOG TRANSDUCER FOR POSITION OR A RELATED PHYSICAL QUANTITY

RELATED APPLICATIONS

The present application is based on International Application Number PCT/IB06/002596 filed Sep. 19, 2006, and claims priority from Italian Application Number TO2005A000643 filed Sep. 20, 2005, the disclosures of which are hereby incorporated by reference herein in their entirety.

TECHNICAL FIELD

The present invention relates to an analogue position or correlated physical quantity transducer, usable for example as a pressure switch in a household appliance, provided with mechanical calibration.

BACKGROUND ART

An electrical-dynamic position or correlated physical quantity transducer, which may be used as a pressure switch in a household appliance and which comprises a rigid casing accommodating within a deformable membrane sensitive to hydraulic pressure is known from Italian patent application n. 2002A000245; a first element consisting of a ferromagnetic core is engaged to the membrane so as to be mobile in a predetermined direction; and a second element consisting of an electrical winding forming an inductor, fixed to the casing, is operatively coupled with the first element to provide a signal variable according to the relative position of the first element with respect to the second.

For example, a relative motion of the core with respect to the inductor along the winding axis produces a variation of resonance frequency of the inductor, which may be detected and processed by a specific electronic circuit carried by the transducer casing, for example to provide a signal proportional to the differential hydraulic pressure exerted in use on the membrane, which, in the case of a washing machine or dryer, is subject on one side to atmospheric pressure and on the opposite side to a hydraulic pressure determined by the level of water present in the tank of the household appliance.

According to the contents of the aforesaid Italian patent application, the transducers of the described type require initial calibration of their transduction feature. Such calibration may be performed by mechanical means, as for example described in DE4444167 B4, or by means of an additional electronic circuit including a non-volatile memory unit for a series of corrective values to be applied to the values processed by the transducer, possibly provided with microprocessor.

However, the known mechanical calibration systems are large in size, present low reliability, are complex to make and assemble and are relatively difficult to use; and the electronic calibration system proposed by the aforesaid Italian patent application is costly and specialised personnel is required for correct use.

DISCLOSURE OF INVENTION

It is the object of the present invention to avoid the drawbacks of the known transducers, by providing a analogue position or correlated physical quantity transducer, usable for example as a pressure switch in a household appliance, free from the described drawbacks and, in particular, which ensures at the same time limited electrical consumption, low production and assembly costs, small size, high reliability, great manufacturing and assembly ease and which finally allows to be calibrated also by personnel not trained in the use of electronic apparatuses.

The present invention therefore relates to an analogue position or correlated physical quantity transducer, in particular usable as pressure switch in a household appliance, typically a washing machine or dryer, as defined in claim 1.

In particular, the transducer according to the invention comprises a rigid casing accommodating a deformable membrane sensitive to hydraulic pressure; a first element engaged to the membrane so as to be mobile with at least one portion of membrane in a predetermined direction; and a second element fixed to the casing and operatively coupled with the first element to provide a signal variable according to the relative position of the first element with respect to the second. Between the first element and the membrane portion are interposed means for varying, along said predetermined direction, the relative position of the first element with respect to the membrane portion.

According to an aspect of the invention, the membrane portion is coupled adjacent with an essentially rigid cap carrying a threaded stem which extends along said predetermined direction; while the first element is integrally carried by a threaded bushing which meshes with the stem; the mechanical calibration system is completed by means (for example screwdriver cuts and/or gripping elements adapted to allow the application of a torque, either manually or with tools) for determining a relative rotation between bushing and stem.

Such rotation means are envisaged on a end of the bushing and/or on a corresponding end of the stem. The latter may be then integrally made with the cap, or removably carried by the cap, relatively mobile along said predetermined direction by means of adjustment means interposed between stem and cap.

Finally, the transducer according to the invention comprises, in combination with the description above, a spring preloaded and fitted between the casing and the membrane, and means for adjusting the preload of the spring.

In this way, it is possible to integrally make, for example by co-moulding, the first element, preferably consisting of a sintered ferromagnetic core, with the bushing, and the cap with the stem and then coupling the two components simply by screwing; furthermore, the transducer requires only one spring, while the previously known transducers, provided with mechanical calibration, required two springs operating at the same time and on opposite sides of the membrane.

This allows to obtain a compact dimension and makes production and assembly very easy. At the same time, the transducer according to the invention is very reliable and may be calibrated by non-specialised personnel, for example by connecting the transducer to a known hydraulic pressure source and a display, and then by turning the bushing until the value read on the display through detection made by the transducer is the same as that of the known hydraulic pressure.

Finally, the transducer according to the invention allows to obtain high cost reductions.

BRIEF DESCRIPTION OF THE DRAWINGS

Further features and advantages of the present invention will be apparent in the description of the following two non-limitative examples, with reference to the accompanying drawings, in which.

BEST MODE FOR CARRYING OUT THE INVENTION

Figure 1:
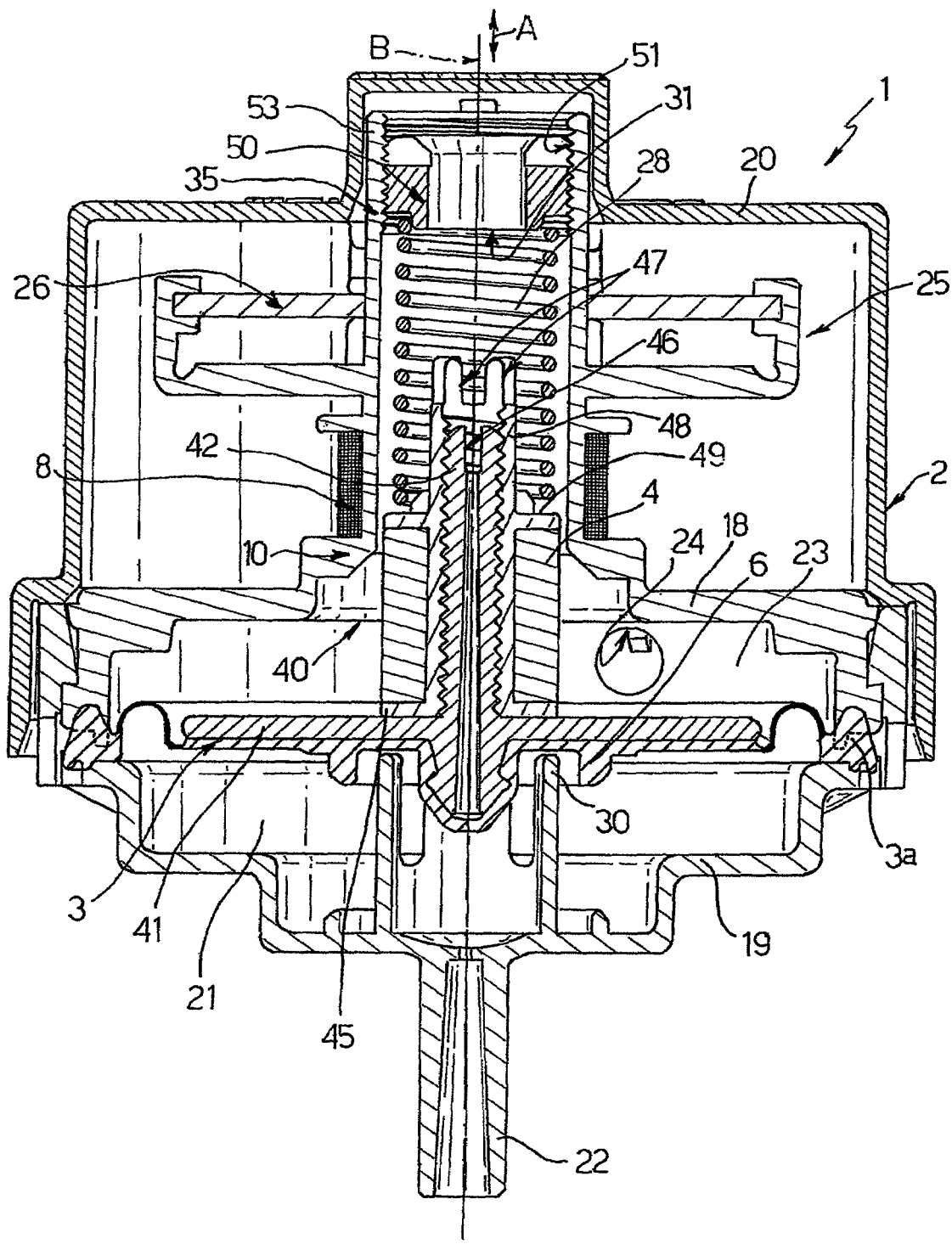
FIG. 1 is a cross-sectional and elevated view of an analogue transducer made according to the invention.

With reference to FIG. 1, number 1 indicates as a whole an analogue position or correlated physical quantity transducer, in particular usable as pressure switch in a household appliance, known and not shown, for example a washing machine or a dryer.

Transducer 1 comprises a rigid casing 2 accommodating deformable membrane 3 sensitive to hydraulic pressure; within casing 1 are also present a first element 4 engaged to membrane 3 so as to be mobile along with at least one portion 6 (in the case in point, a middle portion) of membrane 3 in a predetermined direction, indicated by letter A in FIG. 1; and a second element 8, fixed to the casing 2 and operatively coupled with the first element 4 to provide in use, in the known way, a signal, preferably an electrical signal (but the signal could also be of different nature, for example optical) variable with the relative position of the first element 4 with respect to the second element 8 along direction A.

In the non-limitative illustrated case, first element 4 consists of a ferromagnetic material core 4 engaged rigid on membrane 3; and the second element 8 consists of an electrical winding fixed to the casing 2 and operatively coupled with core 4 to form a variable inductance electrical inductor 10; predetermined direction A also coincides with a symmetry axis B of electrical winding 8, which is also the symmetry axis of casing 2 and of the entire transducer 1.

Casing 2 is made of magnetically neutral material, preferably synthetic plastic material, and is obtained by moulding, split into at least two half shells 18,19 and a cup-shaped cover 20, which are reciprocally snappingly coupled in use. Between half shells 18 and 19 is fluid-tightly packed a peripheral edge 3a of membrane 3, whose plan shape is generally circular, so that the membrane 3 divides the inside of casing 2 into a chamber 21 connected hydraulically to the outside through a nipple 22, and a chamber 23 maintained at atmospheric pressure (for example, through a hole 24 made through half shell 18); over chamber 23, cover 20 defines a closed compartment 25 accommodating inside an electronic board 26 to which the opposite ends of winding 8 are connected in a known way and not shown for the sake of simplicity.

Transducer 1 finally comprises a fixed abutting element 30 of membrane 3, integral with casing 2 (for example being an integral part of half shell 19), against which abutting element 30 membrane 3 rests when transducer 1 is in zero condition, in which membrane 3 is undeformed, because the same pressure is exerted on the opposite sides of the same, respectively facing chambers 21 and 23. A spring 28 for membrane 3 is arranged on the opposite side of the fixed abutting element 30, arranged between membrane 3 and a second abutting element 31 of casing 2, facing and opposite to element 30, with a predetermined preload.

Such second abutting element 31 is, as will be shown more in detail below, provided with adjustment means 35, to vary the preload of spring 28.

According to a first aspect of the invention, between first element 4 and membrane portion 6 are interposed means, indicated as a whole by number 40, to vary, along direction A, the relative position of element 4 with respect to portion 6 of membrane 3; since the latter, in the mentioned zero position, rests against abutting element 30, which is placed at a fixed distance from element (winding) 8, being both integral with casing 2, it results that element 4 is relatively mobile along direction A, also with respect to element 8; furthermore, means 40 are adapted to selectively lock element 4 with respect to portion 6 of membrane 3 in a plurality of different axial positions along axis B; in this way, the relative position along direction A of element 4 with respect to element 8 is selectively variable by means 40 when membrane 3 is resting against abutting element 30, i.e. in zero position of transducer 1.

According to the invention, membrane portion 6 is coupled adjacent to, and closely in contact with, an essentially rigid cap 41 carrying a threaded stem 42 which extends along direction A. Cap 41 and stem 42 are preferably integral and moulded in synthetic plastic resin.

In combination, first element 4 is integrally carried by a threaded bushing 45, which meshes with stem 42; on corresponding ends of bushing 45 and/or stem 42 (in the case in point shown on both) are also envisaged means for determining a relative rotation between bushing 45 and stem 42.

Such rotation means consist in a screwdriver cut 46 made through the end of the stem 42 opposite to cap 41 and facing in use cover 20; and in a series of radial through compartments 47 made through the free end of a tubular shank 48 of bushing 45, integral with the same, and which overhangingly extends from bushing 45 towards cover 20, for a length longer that that of stem 42.

Shank 48 is internally threaded, as the rest of bushing 45, and meshes with the latter on an external threading of stem 42.

According to this embodiment, bushing 42, on the side of shank 48 (i.e. on side opposite to cap 41) presents a shoulder 49 against which one of the ends of spring 28 rests, which is a helical spring, the other end of spring 28 resting against abutting element 31, so that spring 28 is sandwiched between bushing 45 and abutting element 31, which, in this embodiment, is carried relatively mobile to direction A by casing 2.

In particular, according to that shown in FIG. 1, the mentioned means 35 for adjusting the preload of spring 28 comprising a threaded dowel 50 meshing with a threaded seat 51 of casing 2, in the case in point made in a tubular open end 53 of half shell 18 coaxial with winding 8. Abutting element 31 is defined by a shoulder or frontal surface of threaded dowel 50 facing in use on a side opposite to cover 20 and facing bushing 45. Cover 20 is coupled with half casing 18 regardless of half casing 19.

In this way, threaded dowel 50, and with this, abutting element 31, are selectively mobile along predetermined direction A and capable of determining, with membrane 3 in zero position, a required variation (adjustment) of the preload of spring 28, i.e. of the force which this applies in use to the mobile equipment constituted by ferromagnetic core 4 with bushing 45, as well as by cap 41 with stem 42, the latter being held axially integral with bushing 45 by the meshing of the respective threadings.

Furthermore, according to the invention, such selective displacement motion of the abutting element 31 is adjustable independently of the relative axial position of bushing 45 along the stem and, consequently, by the selective determination of the axial position of the magnetic coupling of ferromagnetic core 4 within winding 8.

Figure 2:
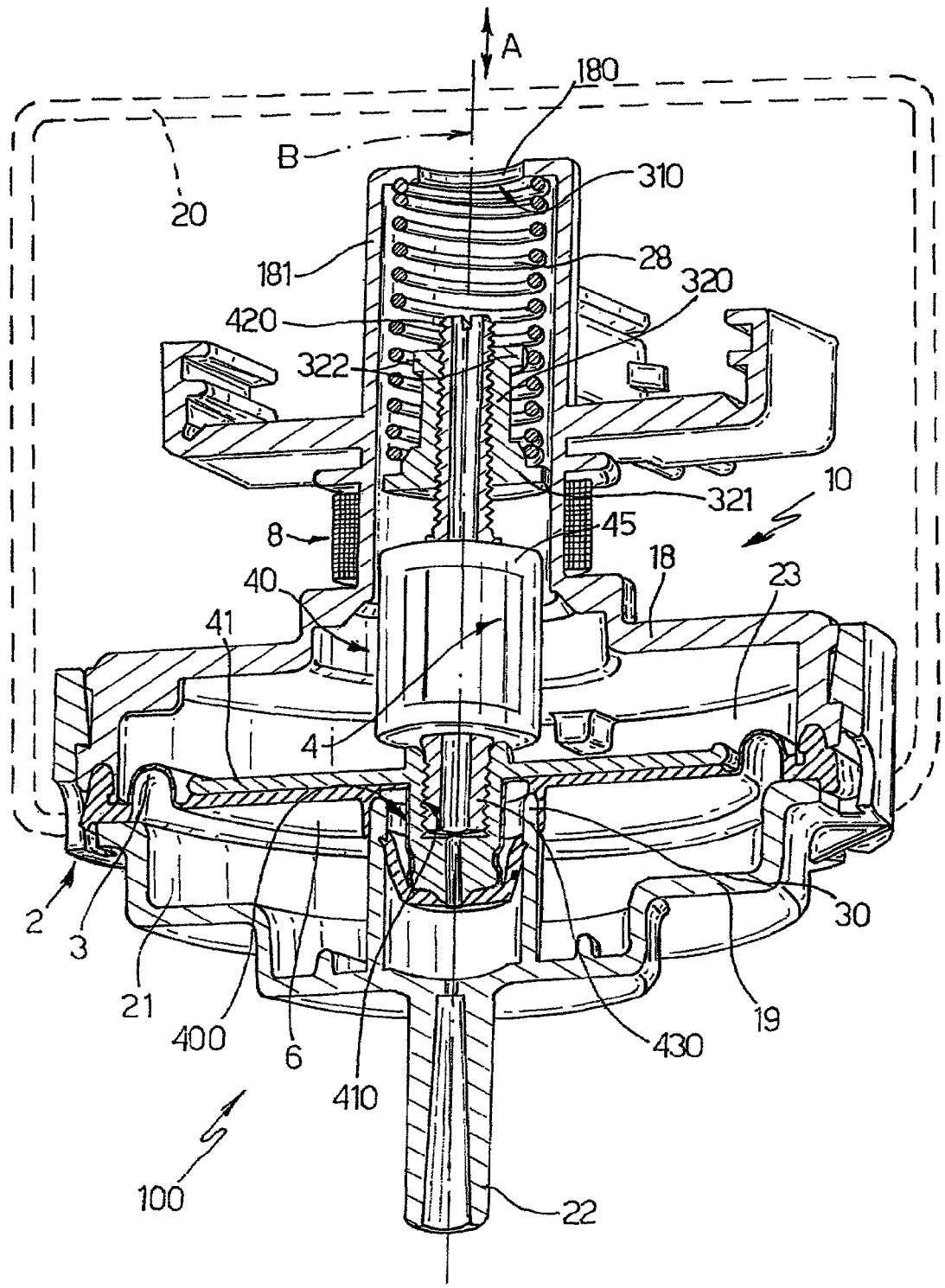
FIG. 2 is a perspective and elevated view with parts removed of a possible variant of the transducer in FIG. 1.

In FIG. 2, number 100 indicates a transducer similar to transducer 1 of which it is a possible variant; details either similar or equal to those previously described for transducer 1 will be indicated for the sake of simplicity using the same reference numbers.

Spring 28 in this case is sandwiched between an abutting element 310 fixed to and carried by casing 2 and therefore integral with second element (winding) 8, and an internally threaded sleeve 320 meshing with an externally threaded stem 420, which, like stem 42, is integrally carried by a cap 41 engaged to the central portion 6 of membrane 3, which is fitted between half shells 18,19 like in transducer 1.

In this embodiment, stem 420 is removably carried by cap 41, with respect to which it is selectively mobile along a predetermined direction A thanks to adjustment means 400 of the relative position of stem 420 with respect to cap 41 along the predetermined direction A, which are interposed between stem 420 and cap 41 and which consist in a threaded blank seat 410 centrally made in cap 41, in axis with winding 8, and in a threaded end 430, of wider diameter, of stem 420; on the rest of stem 420 is fastened bushing 45 carrying co-moulded ferromagnetic core 4, and which is identical to that previously described, except for the fact that shank 48 is missing.

Sleeve 320, thanks to the threaded coupling with stem 420, is axially integral with the same, but at the same time, by being screwed or unscrewed on stem 420, is also relatively mobile with respective abutting element 310 along the pre-determined direction A, regardless of the movements of the mobile equipment defined by membrane 3, by stem 420 and by bushing 45, so as to be selectively positioned in a plurality of different axial positions with respect to abutting element 310 and thus allowing to adjust the force exerted by spring 28 on membrane 3 in zero position; threaded sleeve 320 is for this purpose also provided, towards bushing 45, with a flange 321 adapted to form a resting shoulder for spring 28 towards said mobile equipment; sleeve 320 is also provided with gripping means (for example radial ridges) 322 adapted to allow a user to exert on the same a torque sufficient to determine its screwing or unscrewing on stem 420, for example by means of a tool, through an end passage 180 in a sleeve seat 181 of half shell 18 in which are housed spring 28, sleeve 320 and, in part, bushing 45 with respective stem 420, and externally to which winding 8 is fitted on half shell 18; such passage 180 is closed and covered in use by cover 20.

In use, in both embodiments, nipple 22 is connected for example to a tank of a washing machine or dryer, carrying in chamber 21 a hydraulic pressure, for example corresponding to the level of water in the tank. Membrane 3 is consequently deformed by the pressure difference (chamber 23 always remains at atmospheric pressure) proportionally displacing the axial overlapping of core 4 in winding 8 and thus generating an electrical signal which is processed. The possibility of intervening during calibration, independently, on the pre-load of the spring 28 and on the relative zero position of the core 4 with respect to winding 8 allows a precise and simple calibration of the transducer. The embodiment shown in FIG. 2 allows to obtain more independent movements.

The invention claimed is:

1. An analogue position or correlated physical quantity transducer, comprising:
 a deformable membrane sensitive to hydraulic pressure;
 a casing accommodating therein the membrane;
 a first element engaged to the membrane so as to be mobile with at least one portion of the membrane in a predetermined direction (A);
 a second element fixed to the casing and operatively coupled with the first element to provide a signal variable according to the relative position of the first element with respect to the second element;
 a first adjusting element interposed between said first element and said portion of the membrane for varying, along said predetermined direction, the relative position of said first element with respect to the portion of the membrane;
 a spring preloadedly fitted between the casing and the membrane;
 a second adjusting element for adjusting a preload of the spring;
 a first abutting element which is integral with said casing and against which said membrane rests, under the preload of the spring, when the transducer is in a zero condition, wherein the membrane is undeformed in the zero condition; and
 a second abutting element opposite to said first abutting element in the predetermined direction, said contrast spring being arranged between said membrane and said second abutting element and urging said membrane against the first abutting element in the zero condition.

2. A transducer according to claim 1, wherein:
 said first element is a ferromagnetic material core adjustably attached to the membrane; and
 said second element is an electrical winding fixed to the casing and operatively magnetically coupled with the core to form a variable inductance electrical inductor;
 said predetermined direction (A) coinciding with a symmetry axis (B) of said electrical winding.

3. A transducer according to claim 1, wherein said casing is made of a synthetic plastic material.

4. A transducer according to claim 1, wherein said first adjusting element comprises an essentially rigid cap carrying a threaded stem which extends along said predetermined direction (A); and
 the portion of the membrane is coupled with said cap.

5. A transducer according to claim 4, wherein said first adjusting element further comprises a threaded bushing, which meshes with said stem and which integrally carries said first element; and
 one end of said bushing and/or a corresponding end of said stem includes a member for engaging with a tool or gripping by a user to cause relative rotation between said bushing and said stem.

6. A transducer according to claim 5, wherein said stem is integral with said cap.

7. A transducer according to claim 5, wherein said stem is removably carried by said cap, and relatively mobile along said predetermined direction.

8. A transducer according to claim 7, wherein said stem and said cap are threadedly engaged for adjustment of the relative position of the stem with respect to the cap along said predetermined direction.

9. An analogue position or correlated physical quantity transducer, usable for example as a pressure switch in a household appliance, comprising:
 a rigid casing accommodating a deformable membrane sensitive to hydraulic pressure;
 a first element engaged to the membrane so as to be mobile with at least one portion of membrane in a predetermined direction (A); and
 a second element fixed to the casing and operatively coupled with the first element to provide a signal variable according to the relative position of the first element with respect to the second;
 wherein
 between said first element and said portion of membrane there are interposed means for varying, along said predetermined direction, the relative position of said first element with respect to the portion of membrane;

said membrane portion is adjacently coupled with an essentially rigid cap carrying a threaded stem which extends along said predetermined direction (A);

said transducer further comprises a contrast spring for the membrane preloadedly fitted between the casing and the membrane itself and means for adjusting the contrast spring preload; and said contrast spring is sandwiched between said bushing and an abutting element carried in a relatively mobile fashion by the casing;

said means for adjusting the contrast spring preload including a threaded dowel meshing with a threaded seat of the casing so as to be selectively mobile along said predetermined direction (A) and provided towards the contrast spring with a shoulder forming said abutting element.

10. A transducer according to claim 8, wherein
said spring is tightly secured between the second abutting element, which is fixedly carried by the casing, and a threaded sleeve meshing with said stem so as to be relatively mobile with respect to the second abutting element along said predetermined direction (A);

said threaded sleeve being provided, towards said bushing, with a flange adapted to form a resting shoulder for said spring.

11. A transducer according to claim 8, wherein
said spring is sandwiched between said bushing and said second abutting element, which is carried in a relatively mobile fashion by the casing;

said second adjusting element including a threaded dowel which meshes with a threaded seat of the casing so as to be selectively mobile along said predetermined direction (A) and is provided towards the spring with a shoulder forming said second abutting element.

12. An analogue position or correlated physical quantity transducer, comprising:
a deformable membrane sensitive to hydraulic pressure;
a casing accommodating therein the membrane;
a first element moveable together with at least one portion of the membrane in a predetermined direction, wherein a relative position of said first element with respect to the portion of the membrane is adjustable along said predetermined direction;
a second element fixed to the casing and operatively, magnetically coupled with the first element to provide a signal variable according to a relative position of the first element with respect to the second element;
an adjustably preloaded spring positioned between the casing and the membrane; and
an abutting element against which said membrane rests, under an adjustably preload of the spring, when the transducer is in a zero condition, wherein the membrane is undeformed in the zero condition.

13. A transducer according to claim 12, wherein:
said first element is a ferromagnetic material core adjustably attached to the membrane; and
said second element is an electrical winding fixed to the casing and operatively, magnetically coupled with the core to form a variable inductance electrical inductor.

14. A transducer according to claim 13, further comprising:
a cap coupled with the portion of the membrane and carrying a threaded stem which extends along said predetermined direction; and
a bushing carrying said first element and threadedly engaged with the stem.

15. A transducer according to claim 14, further comprising:
a threaded sleeve meshing with said stem so that a relative position of the sleeve on said stem is adjustable along said predetermined direction;
wherein
said threaded sleeve comprises, towards said bushing, a flange that forms a resting shoulder;
said spring is positioned between the resting shoulder and an end of the casing that is opposite to the abutting element; and
the preload of the spring is adjustable by adjusting the relative position of the sleeve on said stem.

16. A transducer according to claim 15, wherein said stem and said cap are threadedly engaged for adjustment of a relative position of the stem with respect to the cap along said predetermined direction.

17. A transducer according to claim 16, wherein an end of the stem distal from the cap comprises an engagement member for engaging with a tool or gripping by a user to cause relative rotation between said stem and said cap.

18. A transducer according to claim 14, further comprising:
a threaded dowel meshing with a threaded seat at an end of the casing that is opposite to the abutting element,
wherein
said spring is positioned between the dowel and a resting shoulder of the bushing; and
the preload of the spring is adjustable by adjusting a relative position of the dowel with respect to said bushing.

19. A transducer according to claim 18, wherein
said stem is integral with said cap; and
said bushing comprises a tubular shank located beyond a distal end of the stem for engaging with a tool or gripping by a user to cause relative rotation between said bushing and said stem.

20. A transducer according to claim 13, wherein the preload of the spring is adjustable independently of the relative position between the core and the winding.

* * * * *